(No Model.)
E. T. STARR.
DENTIST'S BURR DRILL.
No. 415,983. Patented Nov. 26, 1889.
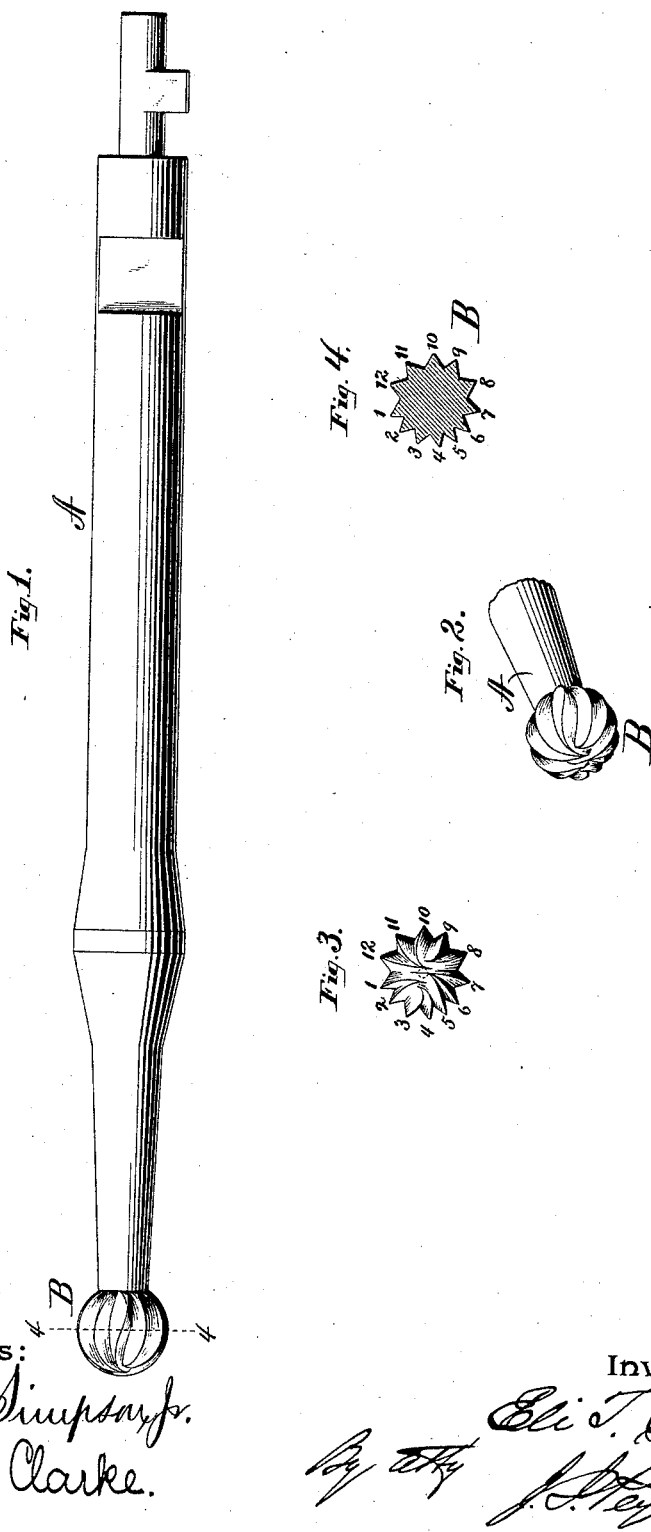
Witnesses:
Edw. F. Simpson, Jr.
Arthur C. Clarke.
Inventor
Eli T. Starr

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

DENTIST'S BURR-DRILL.

SPECIFICATION forming part of Letters Patent No. 415,983, dated November 26, 1889.

Application filed September 21, 1889. Serial No. 324,621. (No model.)

*To all whom it may concern:*

Be it known that I, ELI T. STARR, of Philadelphia, in the county of Philadelphia and State of Pennsylvania, have invented a certain new and useful Improvement in Dentists' Burr-Drills, of which the following is a specification.

My invention relates to an improvement in burr-drills of the class used by dentists in making excavations in teeth either by advancing the drills in the direction of their axes or at angles thereto; and my object is to provide improved tools of this type adapted to cut readily and regularly and free themselves properly from chips or cuttings, while working with but slight friction and heating.

In the accompanying drawings, which show on an enlarged scale a burr-drill adapted to be operated by connection with a dental engine, Figure 1 is a longitudinal view; Fig. 2, a view in perspective of the burr-drill proper, and a portion of its shank; Fig. 3, an end view, and Fig. 4 a transverse section on the line 4 of Fig. 1.

The shank A, which may be of any desired suitable construction, is provided with the tool-head or burr-drill proper B, which, as shown, is in general outline substantially round, as usual. The cutting teeth or ribs, as in this instance shown, are twelve in number. The teeth extending from their inner end or the base of the head meet together or join at their outer ends in separate groups or series, forming terminal teeth with these terminal teeth of the respective series lapping, but not in contact, and extending from various directions around the head, ample spaces being provided between the series of teeth, as well as between the teeth in which they respectively terminate, to allow chips to pass back freely as cut, to clear the cavity, and prevent clogging and heating.

Referring to the drawings, it will be seen that the teeth numbered from 1 to 12, inclusive, are divided into series or grouped together at their outer ends, to form the spaced lapping terminal teeth, in the following way: The teeth 1 and 2 join at their extremities, forming a terminal tooth, which extends slightly beyond and at one side of the longitudinal axis of the head. The teeth 2 and 3 are more widely separated than are teeth 1 and 2, and the teeth 3 and 4 are joined together at their outer ends and are curved in the direction of tooth 2, to constitute a second terminal tooth lapping or extending by the side of the first terminal tooth formed by teeth 1 and 2. The second terminal tooth is sufficiently separated from the first terminal tooth to guard against clogging of the tool by allowing ready escape of chips, the wide space between teeth 2 and 3 accommodating this second terminal tooth. Teeth 5, 6, and 7 are grouped into a third terminal tooth, which extends across and beyond the axis of rotation of the head and at the side of, but sufficiently spaced from, the first terminal tooth, the wide space between teeth 1 and 12 accommodating this third terminal tooth. Teeth 8 and 9 form a fourth terminal tooth, such as constituted by teeth 3 and 4, and at the side of the longitudinal axis of the head opposite thereto. Teeth 10, 11, and 12 are joined into a fifth terminal tooth extending beyond and at one side of the longitudinal axis of the head, substantially as does the first terminal tooth formed by the teeth 1 and 2, but on the opposite side of the axis thereto. This fifth terminal tooth extends between the third and fourth terminal teeth formed, respectively, by the teeth 5, 6, and 7, and 8 and 9, the width of the space between teeth 7 and 8 being sufficient to admit of the projection into it of the fifth terminal tooth, and yet leave ample space for the escape of cuttings.

The advantages of my improvement will readily be understood, and it will be seen that it is not absolutely necessary to resort to the exact number and precise grouping of the teeth above described in embodying my invention, it being necessary only to employ teeth in number sufficient to admit of grouping them properly into two or more series, each series composed of teeth located near each other, joined at their extremities into their respective lapping and spaced terminal teeth, occupying suitable relative positions. Further, it will be seen that it is not necessary, though preferable, to utilize all the teeth in forming the groups extended into terminal teeth, as some of the teeth may terminate at their outer ends free from the groups and the terminal teeth into which the groups are joined.

I claim as my invention—

A burr-drill with ribs or teeth arranged in groups or series respectively extended into spaced lapping terminal teeth, substantially as and for the purpose set forth.

In testimony whereof I have hereunto subscribed my name.

ELI T. STARR.

Witnesses:
CHARLES F. ZIEGLER,
J. I. PEYTON.